United States Patent
Castell

(10) Patent No.: US 10,440,588 B2
(45) Date of Patent: Oct. 8, 2019

(54) ROUTING SIGNALS BASED ON AN ORIENTATION OF DEVICES WITH RESPECT TO EACH OTHER

(71) Applicant: HEWLETT-PACKARD DEVELOPMENT COMPANY, L.P., Houston, TX (US)

(72) Inventor: Robin T Castell, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/542,868

(22) PCT Filed: Apr. 24, 2015

(86) PCT No.: PCT/US2015/027581
§ 371 (c)(1),
(2) Date: Jul. 11, 2017

(87) PCT Pub. No.: WO2016/171727
PCT Pub. Date: Oct. 27, 2016

(65) Prior Publication Data
US 2018/0035310 A1 Feb. 1, 2018

(51) Int. Cl.
| | |
|---|---|
| H04W 16/28 | (2009.01) |
| H04W 40/00 | (2009.01) |
| H01Q 3/24 | (2006.01) |
| H04B 5/00 | (2006.01) |
| H04W 8/00 | (2009.01) |
| H04W 40/20 | (2009.01) |
| H04W 64/00 | (2009.01) |

(52) U.S. Cl.
CPC ............ *H04W 16/28* (2013.01); *H01Q 3/247* (2013.01); *H04B 5/0075* (2013.01); *H04W 8/005* (2013.01); *H04W 40/00* (2013.01); *H04W 40/20* (2013.01); *H04W 64/006* (2013.01)

(58) Field of Classification Search
CPC combination set(s) only.
See application file for complete search history.

(56) References Cited

U.S. PATENT DOCUMENTS

| | | | |
|---|---|---|---|
| 4,181,401 | A | 1/1980 | Jensen |
| 8,242,741 | B2 | 8/2012 | Phelps |
| 2005/0068019 | A1 | 3/2005 | Nakamura et al. |
| 2006/0159158 | A1 | 7/2006 | Moore et al. |
| 2007/0035917 | A1 | 2/2007 | Hotelling et al. |

(Continued)

FOREIGN PATENT DOCUMENTS

| | | |
|---|---|---|
| EP | 2533374 A1 | 12/2012 |
| EP | 2533374 A1 | 12/2012 |

(Continued)

OTHER PUBLICATIONS

"Unison Paradigm® Handheld Touchscreen"; Dec. 2, 2013; 2 pages.

*Primary Examiner* — Junpeng Chen
(74) *Attorney, Agent, or Firm* — HPI Patent Department

(57) ABSTRACT

Examples disclosed herein provide for the detection of an orientation of devices with respect to each other. Based on the orientation, one of the devices may route signals between wireless communication units of the devices, so that wireless communication units from one of the devices to make contact with the other device are properly mapped to input/output ports on the other device.

15 Claims, 5 Drawing Sheets

(56) References Cited

U.S. PATENT DOCUMENTS

| | | | |
|---|---|---|---|
| 2010/0177476 A1 | 7/2010 | Hotelling et al. | |
| 2012/0091211 A1* | 4/2012 | Kuroda | G06K 19/067 |
| | | | 235/492 |
| 2014/0077763 A1 | 3/2014 | Szymanski et al. | |
| 2014/0273833 A1 | 9/2014 | Mccormack | |
| 2015/0048907 A1 | 2/2015 | Almgren et al. | |
| 2015/0115723 A1* | 4/2015 | Levo et al. | H01F 38/14 |
| | | | 307/104 |
| 2015/0302983 A1* | 10/2015 | Park et al. | H01F 38/14 |
| | | | 320/108 |

FOREIGN PATENT DOCUMENTS

| | | |
|---|---|---|
| JP | 2011509645 A | 3/2011 |
| JP | 2014068471 A | 4/2014 |
| KR | 20110120483 A | 11/2011 |
| KR | 10-2011-0120483 A | 11/2012 |
| WO | WO-2011136498 A2 | 11/2011 |
| WO | WO-2012127238 | 9/2012 |
| WO | WO-2012163873 | 12/2012 |

\* cited by examiner

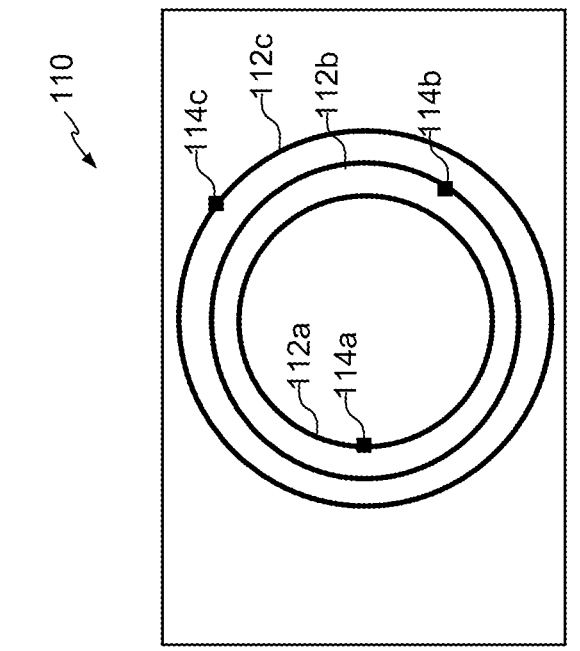
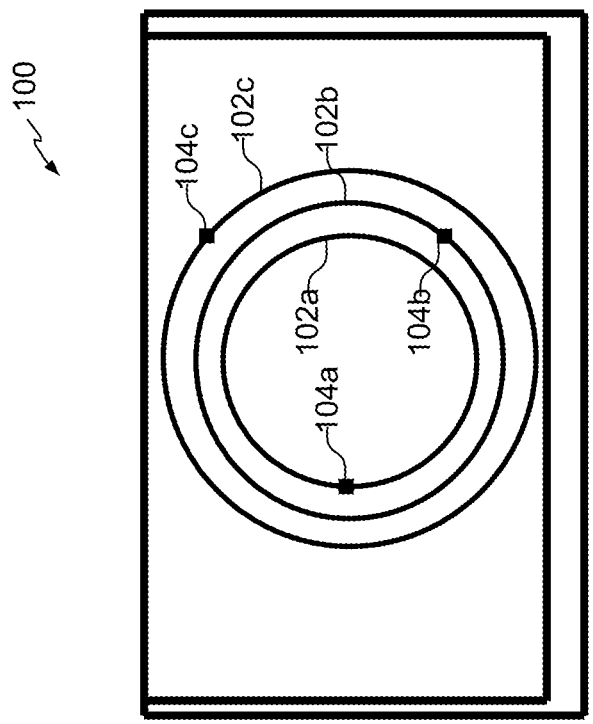
FIG. 1

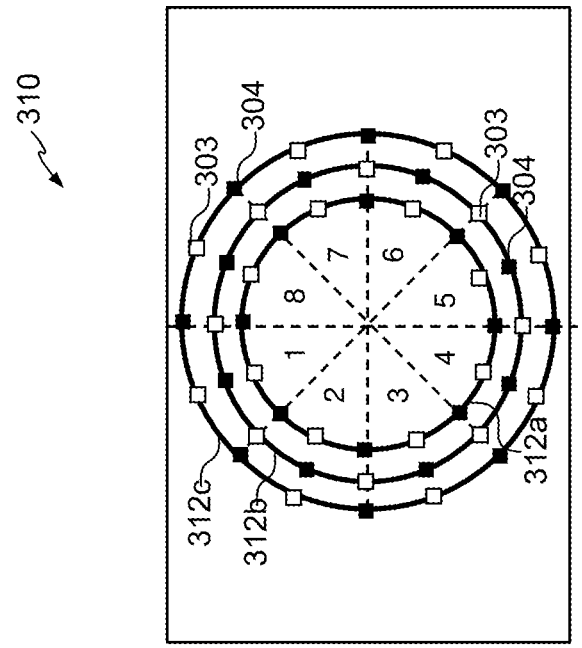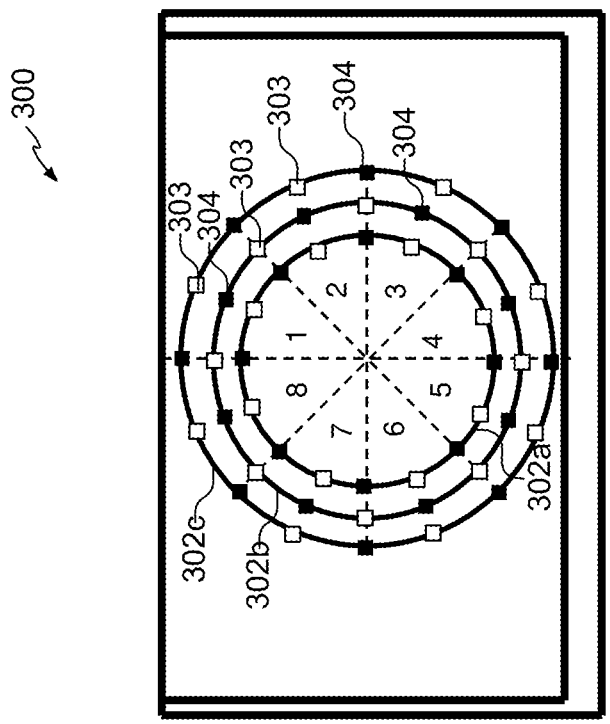
FIG. 3

ROUTING SIGNALS BASED ON AN ORIENTATION OF DEVICES WITH RESPECT TO EACH OTHER

BACKGROUND

Consumers appreciate ease of use and reliability in their devices. They also appreciate aesthetically pleasing designs. Businesses may, therefore, endeavor to create and provide devices directed toward one or more of these objectives.

BRIEF DESCRIPTION OF THE DRAWINGS

FIG. 1 illustrates devices with mechanisms to wirelessly communicate with each other once the devices are brought within proximity of each other and the mechanisms align, according to an example;

FIG. 3 illustrates devices with mechanisms that are segmented to wirelessly communicate with each other once the devices are brought within proximity of each other and the segmented mechanisms align, according to an example;

DETAILED DESCRIPTION

Figure 2:
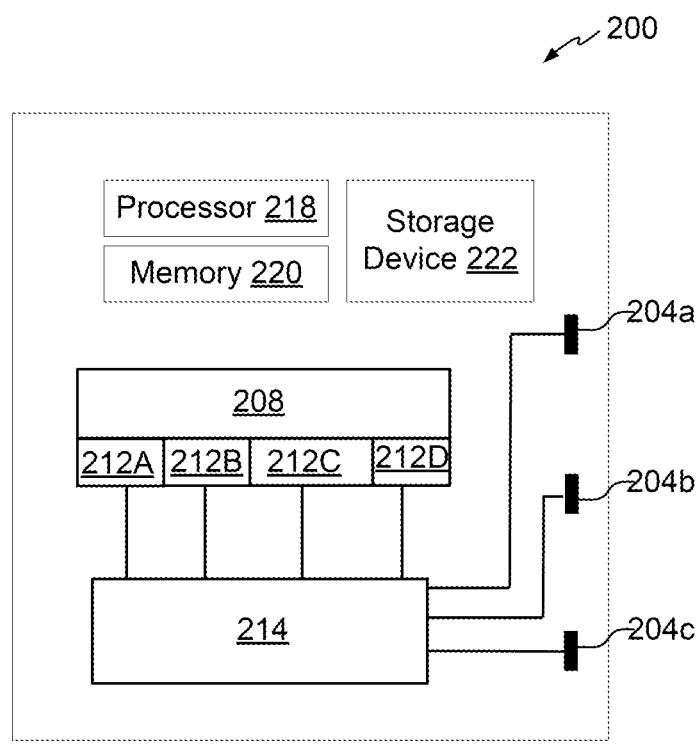
FIG. 2 provides an example illustration of a device with wireless communication units.

Communications between devices at times involve the use of physical connections. For example, a notebook computer may be docked to a docking station in order to connect to common peripherals, such as a monitor, keyboard, and mouse. Such physical connections may include the use of an interconnect assembly. Interconnect assemblies may include various mechanical components or elements, such as prongs, plugs, pins, or clips, which matingly engage a corresponding socket, aperture, opening or receptacle during connection. Examples of such interconnect assemblies include connection schemes between devices, and various cable assemblies (e.g., Universal Serial Bus, Video Graphics Array, High Definition Multimedia Interface, IEEE 1394, etc.) for use with devices, such as computers, tablets, mobile phones, televisions, and personal digital assistants. With regards to docking connection schemes, for example, between a notebook computer and a docking station, the notebook computer may need to be properly aligned with the docking station in order to mechanically engage the interconnect assembly between the devices.

The mechanical parts of these interconnect assemblies can be subject to damage and/or fatigue, which can compromise the integrity of a connection. Additionally, dirt, debris, moisture, and other contaminants may collect on or enter such interconnect assemblies and their corresponding sockets, apertures, openings or receptacles which can render them, and/or any devices to which they are connected, inoperable. Furthermore, such interconnect assemblies and their corresponding sockets, apertures, openings and receptacles may detract from the aesthetics of a device for at least some consumers.

Examples disclosed herein provide interconnect assemblies that allow devices to wirelessly communicate with each other. As an example, devices may include wireless communication units within their respective housings, which allow the devices to establish wireless communication links and communicate with each other once they are brought within proximity of each other. Devices utilizing interconnect assemblies that allow wireless communication with other devices may allow manufacturers to design such devices with no apertures or holes for connectors, contributing to the overall aesthetic appeal of the devices. As will be further described, devices may be placed next to each other without regard to device orientation, allowing users to initiate wireless communications between the devices with minimal effort.

As used herein, the term "transceive" is defined as including both transmission and reception of data in the form of one or more signals. As used herein, the terms "wireless" and "wirelessly" are defined as including, but are not necessarily limited to, a connection or coupling that does not require mechanical components or elements such as prongs, plugs, pins, or clips that matingly engage a corresponding socket, aperture, opening or receptacle. Wireless connections and couplings may operate in any of a variety of different frequency ranges and wavelengths. They may also be established electrically, magnetically, or optically.

As used herein, the term "device" is defined as including, but is not necessarily limited to, a computer, tablet, mobile phone, television, personal digital assistant, monitor, display, audio component, peripheral, printer, dock, sleeve, docking station, or appliance.

With reference to the figures, FIG. 1 illustrates devices 100, 110 with mechanisms to wirelessly communicate with each other once the devices 100, 110 are brought within proximity of each other and the mechanisms align, according to an example. As will be further described, each device may include a structure of isolated concentric circular waveguides with wireless communication units to create a multi-lane coupler between the devices 100, 110 once they are brought within proximity of each other, in effect establishing the wireless communication links between the devices 100, 110. As will be further described, each circular waveguide of a device to couple with a circular waveguide of another device may be used to enable communications between the devices, such as enabling input/output (I/O) port functionality between the devices. The concentric waveguides may provide flexibility in the orientation of the devices 100, 110 when they are brought within proximity of each other, by maintaining the wireless communication links between the devices 100, 110, regardless of orientation.

Each of the circular waveguides of the concentric waveguide structure may be coupled to wireless connector integrated circuits (ICs) or wireless communication units. As mentioned above, the signals from a wireless communication unit may operate in any of a variety of different frequency ranges and wavelengths. They may also be established electrically, magnetically, or optically. As an example, a wireless communication unit may operate in the extremely high frequency (EHF) range. In other examples, a wireless communication unit may operate substantially at sixty (60) gigahertz (GHz). In still other examples, a wireless communication unit may operate substantially in an infrared frequency range. By coupling a wireless communication unit to a circular waveguide, the waveguide may also operate at the same frequency, allowing for the wireless communications independent of device orientation, as mentioned above. As a result, the devices 100, 110 may align to each other according to an orientation varying between 0 degrees and 360 degrees, resulting in angular rotational freedom. As an example, the circular waveguide may be a suitable medium for operating at the same frequency as the wireless communication unit, such as a plastic waveguide.

As will be further described, use of such wireless technology for a wireless communication unit helps to eliminate the issues, described above, associated with interconnect assemblies that utilize mechanical components.

As mentioned above, each device may include a structure of isolated concentric circular waveguides with wireless communication units. For example, circular waveguide 102a of device 100 may be coupled to a wireless communication unit 104a. Similarly, circular waveguide 102b may be coupled to wireless communication unit 104b, and circular waveguide 102c may be coupled to wireless communication unit 104c. Although three concentric waveguides are illustrated for device 100, any number of concentric waveguides may be utilized. For example, the number of lanes can be expanded by providing additional concentric waveguides. As example, each circular waveguide of a device may be assigned to a fixed input/output (I/O) port or assigned to any one of a set of available I/O ports. As will be further described, assignments of the I/O ports to the circular waveguides may be made based on the results of a discovery mechanism applied to connected devices. Similar to device 100, device 110 may include a corresponding number of concentric circular waveguides to align with the waveguides of device 100. For example, circular waveguide 112a may be coupled to wireless communication unit 114a. Similarly, circular waveguide 112b may be coupled to wireless communication unit 114b, and circular waveguide 112c may be coupled to wireless communication unit 114c.

As an example, once waveguides 102a, 102b, and 102c of device 100 align with waveguides 112a, 112b, and 112c of device 110, respectively, wireless communication links may be established between devices 100, 110. For example, once the circular waveguides from the devices 100, 110 are aligned, they form coupled waveguides that provide for end to end connectivity between the devices 100, 110. As an example, alignment of the concentric circles may be ensured by either a mechanical alignment feature or through alignment magnets positioned appropriately on both devices 100, 110 (not illustrated).

As an example, as the devices 100, 110 are placed within proximity of each other, the alignment features may cause devices 100, 110 to self-align with each other. As an example, magnetic members positioned appropriately on both devices 100, 110 may be arranged to produce magnetic fields that cooperate with each other to generate a magnetically attractive retention force that attaches the devices 100, 110 together in a mating engagement. Properties of the magnetic members that may be controlled include, but are not limited to, field strength and magnetic polarity. This magnetic coupling may allow for the devices 100, 110 to remain magnetically coupled to each other until a sufficient force is applied to overcome the magnetic coupling.

Once aligned, wireless communication units from circular waveguides in one device may communicate wirelessly with wireless communication units from circular waveguides in another device. However, it is not necessary for the devices 100, 110 to be oriented with respect to each other such that the wireless communication units are physically opposite each other. Rather, as the circular waveguides coupled to the wireless communication units may also operate at the same frequency as the wireless communication units, as described above, it is sufficient for the circular waveguides from each device to be aligned in order to accomplish the wireless communication links. As a result, the devices 100, 110 may align to each other according to an orientation varying between 0 degrees and 360 degrees, resulting in angular rotational freedom.

Referring to FIG. 1, when placing devices 100, 110 next to each other (e.g., placing device 110 on top of device 100), it is not necessary for wireless communication unit 104c of device 100 to be physically opposite wireless communication unit 114c of device 110 in order to establish a wireless communication link between the units 104c, 114c. Rather, as circular waveguide 102c operates at the same frequency as wireless communication unit 104c, and as circular waveguide 112c operates at the same frequency as wireless communication unit 114c, it is sufficient for only the circular waveguides 102c, 112c to be aligned in order to accomplish the wireless communication link between wireless communication units 104c, 114c. As a result, the devices 100, 110 may be placed next to each other without regard to orientation, as long as the circular waveguides are aligned to each other, for example, via the alignment features described above.

As an example, the wireless communication units may be designed for short range proximity connectivity applications. For example, it may not be desirable to establish the wireless communication links when the devices 100, 110 are not in proximity to each other (e.g., more than several centimeters from each other), particularly to avoid signal loss or signal interference with other wireless communication units within the devices 100, 110 or surrounding devices. Once wireless communication links are established between the devices 100, 110, data connectivity may be achieved between the devices 100, 110. Examples include various cable assemblies (e.g., Universal Serial Bus, Video Graphics Array, High Definition Multimedia Interface, IEEE 1394, etc.) for use with devices, such as computers, tablets, mobile phones, televisions, and personal digital assistants. As an example, transmissions of signals from the wireless communication units may propagate via the coupled circular waveguide and pass through an enclosure wall of the devices 100, 110. In order for transmissions from the wireless communication units to exit the enclosure walls, the materials and wall thickness may be chosen appropriately.

Once the devices 100, 110 are coupled to each other, the wireless communication units may transceive data with each other. For example, wireless communication unit 102a may transceive data with wireless communication unit 112a, wireless communication unit 102b may transceive data with wireless communication unit 112b, and wireless communication unit 102c may transceive data with wireless communication unit 112c. Although the wireless communication units may transmit and receive data, only one way communication may be involved. For example wireless communication unit 102a of device 100 may transmit data while wireless communication unit 112a of device 110 receives the data from wireless communication unit 102a.

As mentioned above, each circular waveguide of a device may be used for enabling wireless communications with a corresponding circular waveguide of another device. As an example, each circular waveguide may be assigned to a fixed input/output (I/O) port or assigned to any one of a set of available I/O ports. As an example, if the port assignments between devices 100, 110 are fixed, once wireless communication links are established between the concentric circular waveguides, data connectivity between the devices 100, 110 may be achieved in order to support a particular port. For example, if device 100 is a docking station, and wireless communication unit 104c is assigned to a USB port on the docking station, when device 110 is docked to the docking station, signals may be routed so wireless communication unit 114c of device 110 may be properly mapped to the USB port on the docking station. However, for greater flexibility, it is possible to arrange for a discovery protocol that can probe the capabilities of devices once they are placed within proximity of each other, and set port assignments based on the capabilities or a particular configuration.

FIG. 2 provides an example illustration of a device 200 with wireless communication units 204a-204c. As an example, the wireless communication units 204a-204c may correspond to the wireless communication units 102a-102c of device 100 or wireless communication units 112a-112c of device 110. As will be further described, the device 200 may include a routing unit to appropriately route signals on the device 200 so that the wireless communication units 204a-204c to make wireless contact with wireless communication units of another device are dynamically assigned and properly mapped to enable wireless communications between device 200 and the other device. As an example, in order to properly map the wireless communication units 204a-204c on the device 200, a discovery process may be utilized to discover protocols or capabilities associated with the other device.

As an example, the routing unit may include a platform controller hub (PCH) 208 and a port control and switching matrix 214. The PCH 208 may assign I/O functions 212A-D based on the discovery process described above for detecting the I/O ports or capabilities on the other device. The I/O functions 212A-D available for assignment include, but are not limited to display protocols, such as HDMI, and communications protocols, such as USB. Although four functions are available for assignment via the PCH 208, any number of functions may be made available via the PCH 208. Once assignments have been made via the PCH 208, logic for the various functions may be routed via the port control and switching matrix 214 to the appropriate wireless communication units 204a-204c on the device 200.

As illustrated, each wireless communication unit on the device 200 is individually connected to the switching matrix 214, which controls the mapping and selection of each wireless communication unit to an I/O port on the port hub. The switching matrix 214 may dynamically assign different types of I/O ports to a particular wireless communication unit on the device 200 to allow flexibility in I/O configuration based on the type of devices that are connected or the desired interconnect capability required by the application or use case. As an example, the switching matrix 214 may set a wireless communication unit on the device 200 to either transmit mode or receive mode, such that it aligns with a desired capability of the other device.

As an example, when aligning device 200 with another device (e.g., when the concentric circular waveguides of the devices 100, 110 are aligned), one of the wireless communication units (e.g., wireless communication unit 204b) can be assigned to low speed signals and general-purpose input/output (GPIO) via aggregation logic contained within the port control and switching matrix 214 logic. This wireless communication unit may be used for miscellaneous control/status, GPIO, and slow speed serial buses. This wireless communication unit may also be used for port discovery and negotiation protocol for determining the type of connected peripheral and thereby how the ports should be configured.

The device 200 may be, for example, a laptop computer, tablet computer, mobile computing device, or a cellular phone. The device 200 also includes a processor 218 and a storage device 222. The components of the device 200 may be connected and communicate through a system bus (e.g., PCI, ISA, PCI-Express, HyperTransport®, NuBus, etc.). The processor 218 can be a single core processor, a multi-core processor, a computing cluster, or any number of other configurations. The processor 218 may be implemented as Complex Instruction Set Computer (CISC) or Reduced Instruction Set Computer (RISC) processors, x86 Instruction set compatible processors, multi-core, or any other microprocessor or central processing unit (CPU). As an example, the main processor 218 includes dual-core processor(s), dual-core mobile processor(s), or the like.

The device 200 may include a memory device 220. The memory device 220 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The storage device 222 may be a non-transitory computer-readable storage medium. The storage device 222 may have instructions stored thereon that, when executed by a processing resource, such as the processor 218, cause the device 200 to perform operations.

In some examples, the instructions can be part of an installation package that, when installed, can be executed by processing resource(s) to implement the operations. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a server including the processing resource. In such examples, the machine-readable storage medium may include memory such as a hard drive, solid state drive, or the like. In other examples, some or all of the functionalities described may be implemented in the form of electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

FIG. 3 illustrates devices 300, 310 with mechanisms that are segmented to wirelessly communicate with each other once the devices 300, 310 are brought within proximity of each other and the segmented mechanisms align, according to an example. As will be further described, each device may include a structure of concentric waveguides, wherein waveguides from the structure are split into sectors and each sector including a wireless communication unit to establish a wireless communication link with a corresponding wireless communication unit of another device. By splitting the waveguides into sectors, a number of additional communication channels between devices 300, 310 may be supported, while maintaining the same number of concentric circular waveguides as, for example devices 100, 110 in FIG. 1 (e.g., three concentric circular waveguides). Although additional concentric circular waveguides may be added to devices 100, 110 in order to provide additional communication channels between devices 100, 110, there may be spacing issues within the devices 100, 110 for accommodating the additional concentric circular waveguides.

As an example, the device 300 may include three concentric circular waveguides 302a-302c, and device 310 may include three concentric circular waveguides 312a-312c. Although three concentric waveguides are illustrated for each device, any number of concentric waveguides may be utilized. As will be further described, the waveguides may be split into sectors, in order to support addition communication channels between devices 300, 310. As an example, the waveguides may be split into eight segments, as illustrated. However, the waveguides may be split into more or less segments, based on the number of communication channels to be supported between the devices 300, 310. As illustrated, the waveguides may be split by breaks 303 (white boxes). In between two breaks 303, referred to as a sector or segment of the waveguide, each sector may include a wireless communication unit 304. By splitting waveguides 302a-302c of device 300 and waveguides 312a-312c of device 310 into eight segments, each waveguide includes eight wireless communication units 304, totaling 24 wireless communication units 304 for each device. As a result, segmenting the waveguides provide 24 communication channels between devices 300, 310, compared to the three communication channels between devices 100, 110.

Although segmenting the concentric circular waveguides of devices 300, 310 into sectors may provide additional communication channels between the devices, angular rotational freedom may be restricted (e.g., compare to the angular rotational freedom provided between devices 100, 110). For example, when placing devices 300, 310 next to each other (e.g., placing device 310 on top of device 300), and lining up the segments (e.g., segment 1 of device 300 with segment 1 of device 310), although it may not be necessary for wireless communication unit 304 of waveguide 302b in segment 1 to be physically opposite wireless communication unit 304 of waveguide 312b in segment 1, angular rotation of the devices 300, 310 may be limited to the wireless communication unit 304 of one device remaining within the corresponding segment of the other device. However, that restriction or constraint with regards to angular rotation may be alleviated by adding additional port muxing or switching to the wireless communication units 304 of the devices 300, 310, as will be further described.

Figure 4:
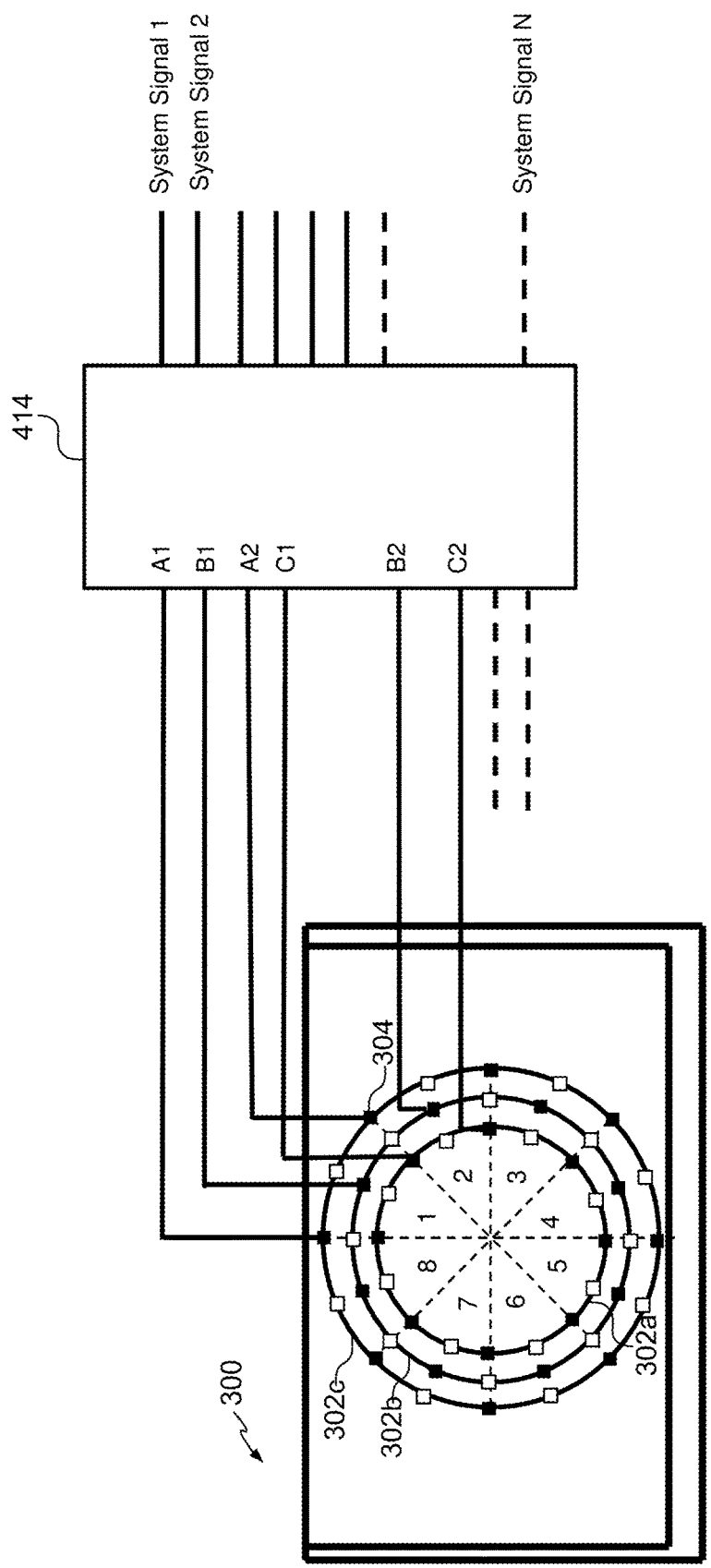
FIG. 4 provides an example illustration of device with a switching matrix for electrically routing appropriate signals to each wireless communication unit of the device.

FIG. 4 provides an example illustration of device 300 with a switching matrix 414 for electrically routing appropriate signals (e.g., System Signal 1-System Signal N) to each wireless communication unit 304 of the device 300. By utilizing the switching matrix 414 to route appropriate signals to each wireless communication unit 304, the restriction with regards to the angular rotation described above may be alleviated, as will be further described. Although not illustrated, device 310 may also include a switching matrix for electrically routing appropriate signals to each wireless communication unit 304 of the device 310. However, only one of the devices 300, 310 may include the switching matrix for providing angular rotational freedom. Similar to device 200, device 300 may include a processor, storage device, and memory. As an example, the storage device may have instructions stored thereon that, when executed by the processor, cause the device 300 to perform operations.

The switching matrix 414 may be part of a routing unit of the device 300 for appropriately routing the signals to the wireless communication units 304. In addition to the switching matrix 414, the routing unit may include a PCH for assigning I/O functions based on a discovery or segment alignment search protocol (e.g., see FIG. 2. As described above, one of the wireless communication units 304 of device 300 can be assigned to low speed signals and general-purpose input/output (GPIO) via aggregation logic contained within the switching matrix 414 logic. This wireless communication unit may be used for miscellaneous control/status, GPIO, and slow speed serial buses. This wireless communication unit may also be used for port discovery and negotiation protocol for determining the type of connected peripheral and thereby how the wireless communication units 304 should be configured.

With the ability to route appropriate signals to each wireless communication unit 304 via the switching matrix 414, the segmented waveguides, for example, of devices 300, 310, may provide flexibility in the orientation of the devices 300, 310 when they are brought within proximity of each other, by maintaining the wireless communication links between the devices 300, 310, regardless of orientation. As an example, a discovery or segment alignment search protocol may determine how the segments of device 300 line up with the segments of device 310, and the switching matrix 414 may route appropriate signals to each wireless communication unit 304 to properly map and enable wireless communications between devices 300, 310.

For example, if device 300 is a docking station, and includes a USB port that may be utilized by device 310 when device 310 is docked to the docking station, the switching matrix 414 of the docking station (e.g., device 300) may route the signal from the USB port (e.g., System Signal 1) to the appropriate wireless communication unit 304 of the docking station in order to properly map the USB port to the device 310. As an example, if the protocol for supporting USB ports is provided by wireless communication unit 304 of waveguide 312b in segment 5 of device 310, in order to properly map the USB port, the switching matrix 414 of the docking station may route System Signal 1 to the wireless communication unit 304 of waveguide 302b of the docking station that is aligned to segment 5 of device 310. Similarly, the switching matrix 414 may change the routing of System Signal 1 each time, based on the orientation of device 310 with respect to the docking station, allowing for angular rotational freedom.

Figure 5:
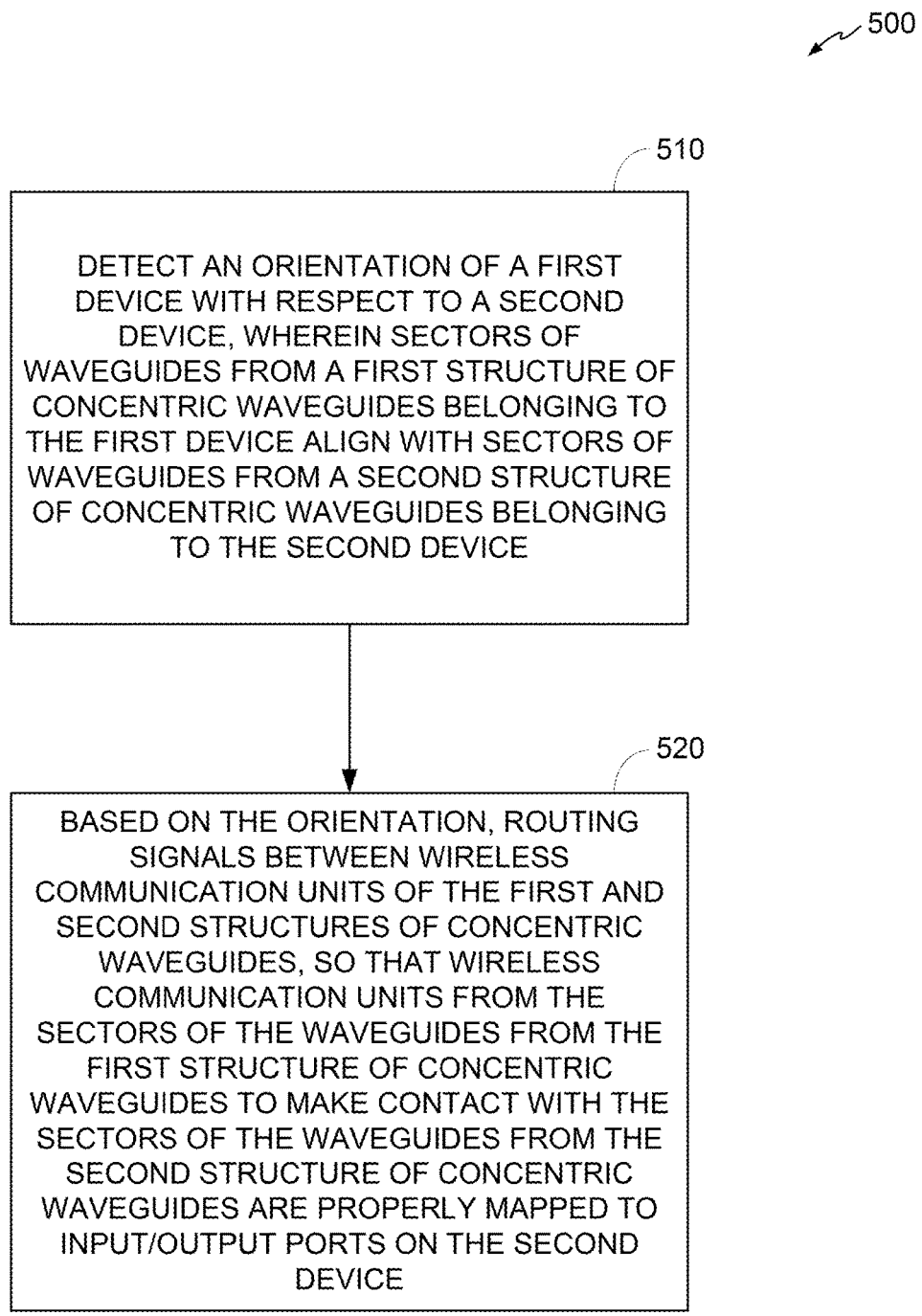
FIG. 5 is a flow diagram in accordance with an example of the present disclosure.

Referring to FIG. 5, a flow diagram is illustrated in accordance with various examples. The flow diagram illustrates, in a particular order, processes for detecting the orientation of a first device with respect to a second device (e.g., devices 300, 310). The order of the processes is not meant to limit the disclosure. Rather, it is expressly intended that one or more of the processes may occur in other orders or simultaneously. The disclosure is not to be limited to a particular example.

A method 500 may begin and progress to 510, where a first device may detect an orientation of the first device with respect to a second device. As an example, sectors of waveguides from a first structure of concentric waveguides belonging to the first device may align with sectors of waveguides from a second structure of concentric waveguides belonging to the second device. As an example, the orientation of the first device with respect to the second device is determined based on a discovery or segment alignment search protocol.

Progressing to 520, based on the orientation, the first and/or second devices may route signals between wireless communication units of the first and second structures of concentric waveguides, so that wireless communication units from the sectors of the waveguides from the first structure of concentric waveguides to make contact with the sectors of the waveguides from the second structure of concentric waveguides are properly mapped to input/output ports on the second device. As an example, the input/output ports correspond to wireless communication units from the sectors of the waveguides from the second structure of concentric waveguides of the second device. By routing the signals between the wireless communication units of the first and second structures of concentric waveguides, the first device may align to the second device according to an orientation varying between 0 degrees and 360 degrees, resulting in angular rotational freedom.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A device comprising:
   a first structure of concentric waveguides, wherein waveguides from the first structure of concentric waveguides are split into sectors, each sector comprising a wireless communication unit;
   alignment members to align the device to another device comprising a second structure of concentric waveguides, wherein the sectors of the waveguides from the first structure of concentric waveguides are to align with sectors of waveguides from the second structure of concentric waveguides; and
   based on an orientation of the device with respect to the other device, a routing unit to route signals so that the wireless communication units from the sectors of the waveguides from the first structure of concentric waveguides to make contact with the sectors of the waveguides from the second structure of concentric waveguides are dynamically assigned and properly mapped to input/output ports on the other device, wherein the input/output ports correspond to wireless communication units from the sectors of the waveguides from the second structure of concentric waveguides of the other device.

2. The device of claim 1, wherein the device is to align to the other device according to an orientation varying between 0 degrees and 360 degrees.

3. The device of claim 2, wherein the routing unit is to route the signals to different wireless communication units from the sectors of the waveguides from the first structure of concentric waveguides, based on the orientation of the device with respect to the other device.

4. The device of claim 1, wherein the alignment members comprise magnetic members, and wherein when the device is to align to the other device, the magnetic members of the device are to magnetically couple with magnetic members of the other device.

5. The device of claim 1, wherein each wireless communication unit of a sector of the waveguides from the first structure of concentric waveguides is to communicate with a corresponding wireless communication unit of an aligned sector of the waveguides from the second structure of concentric waveguides.

6. The device of claim 1, wherein the wireless communication units operate in an extremely high frequency (EHF) range.

7. The device of claim 6, wherein each sector of the waveguides from the first and second structures of concentric waveguides operate at the same frequency as the wireless communication unit from the sector.

8. A method comprising:
   detecting an orientation of a first device with respect to a second device, wherein sectors of waveguides from a first structure of concentric waveguides belonging to the first device align with sectors of waveguides from a second structure of concentric waveguides belonging to the second device; and
   based on the orientation, routing signals between wireless communication units of the first and second structures of concentric waveguides, so that wireless communication units from the sectors of the waveguides from the first structure of concentric waveguides to make contact with the sectors of the waveguides from the second structure of concentric waveguides are dynamically assigned and properly mapped to input/output ports on the second device, wherein the input/output ports correspond to wireless communication units from the sectors of the waveguides from the second structure of concentric waveguides of the second device.

9. The method of claim 8, wherein the first device is to align to the second device according to an orientation varying between 0 degrees and 360 degrees.

10. The method of claim 9, wherein routing comprises routing the signals to different wireless communication units from the sectors of the waveguides from the first structure of concentric waveguides, based on the orientation of the first device with respect to the second device.

11. The method of claim 10, wherein the signals to the different wireless communication units remain mapped to specific input/output ports on the second device as the orientation of the first device changes with respect to the second device.

12. The method of claim 8, wherein the orientation of the first device with respect to the second device is determined based on a discovery or segment alignment search protocol.

13. A non-transitory computer-readable storage medium comprising programming instructions, which, when executed by a processing resource, cause the processing resource to:
   detect an orientation of a first device with respect to a second device, wherein sectors of waveguides from a first structure of concentric waveguides belonging to the first device align with sectors of waveguides from a second structure of concentric waveguides belonging to the second device;
   based on the orientation, route signals between wireless communication units of the first and second structures of concentric waveguides, so that wireless communication units from the sectors of the waveguides from the first structure of concentric waveguides to make contact with the sectors of the waveguides from the second structure of concentric waveguides are dynamically assigned and properly mapped to input/output ports on the second device, wherein the input/output ports correspond to wireless communication units from the sectors of the waveguides from the second structure of concentric waveguides of the second device.

14. The non-transitory computer-readable storage medium of claim 13, wherein the instructions to route comprises instructions to route the signals to different wireless communication units from the sectors of the waveguides from the first structure of concentric waveguides, based on the orientation of the first device with respect to the second device.

15. The non-transitory computer-readable storage medium of claim 13, wherein the orientation of the first device with respect to the second device is determined based on a discovery or segment alignment search protocol.

* * * * *